US 011537551B2

(12) United States Patent
Shahin et al.

(10) Patent No.: US 11,537,551 B2
(45) Date of Patent: *Dec. 27, 2022

(54) SYSTEMS AND METHODS FOR DISTRIBUTED FILE PROCESSING

(71) Applicant: JPMORGAN CHASE BANK, N.A., New York, NY (US)

(72) Inventors: Shahin Mahmoud Shahin, Clifton, NJ (US); Vladimir Knajtner, Brooklyn, NY (US); Michel N. Victor, Sunnyside, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/111,125

(22) Filed: Dec. 3, 2020

(65) Prior Publication Data

US 2021/0089494 A1 Mar. 25, 2021

Related U.S. Application Data

(63) Continuation of application No. 15/630,022, filed on Jun. 22, 2017.

(51) Int. Cl.
*G06F 16/11* (2019.01)
*G06F 16/17* (2019.01)
*G06F 16/182* (2019.01)

(52) U.S. Cl.
CPC ........ *G06F 16/113* (2019.01); *G06F 16/1727* (2019.01); *G06F 16/182* (2019.01)

(58) Field of Classification Search
CPC ... G06F 16/113; G06F 16/1727; G06F 16/182
See application file for complete search history.

(56) References Cited

U.S. PATENT DOCUMENTS

| 6,078,933 A | 6/2000 | Szalwinski |
| 10,289,496 B1 | 5/2019 | Chopra et al. |
| 10,298,709 B1 | 5/2019 | Hubbell et al. |
| 2010/0037056 A1 | 2/2010 | Follis et al. |
| 2014/0006354 A1 | 1/2014 | Parkison et al. |
| 2014/0006357 A1 | 1/2014 | Davis et al. |
| 2014/0006465 A1 | 1/2014 | Davis et al. |
| 2014/0052706 A1 | 2/2014 | Misra et al. |
| 2014/0122429 A1 | 5/2014 | Chen et al. |

(Continued)

*Primary Examiner* — Robert W Beausoliel, Jr.
*Assistant Examiner* — Mohammad S Bhuyan
(74) *Attorney, Agent, or Firm* — Greenberg Traurig LLP

(57) ABSTRACT

Systems and methods for distributed file processing are disclosed. In one embodiment, a computer-implemented method for distributed file processing in a distributed network may include: (1) receiving, at a first distributed host in a network of a plurality of distributed hosts, an archive command; (2) the first distributed host identifying a plurality of files in a shared file system to archive in response to the archive command; (3) the first distributed host splitting at least one of the plurality of files that is above a predetermined size into a plurality of file chunks; (4) the first distributed host instructing a second distributed host to archive one of the plurality of files or plurality of file chunks to a store; and (5) the first distributed host and the second distributed host archiving the plurality of files and the plurality of file chunks to the store.

6 Claims, 3 Drawing Sheets

(56) References Cited

U.S. PATENT DOCUMENTS

2015/0199243 A1     3/2015   Wu et al.
2015/0293817 A1   10/2015   Subramanian et al.
2018/0300203 A1* 10/2018   Kathpal .............. G06F 11/1464

* cited by examiner

SYSTEMS AND METHODS FOR DISTRIBUTED FILE PROCESSING

This application is a Continuation of U.S. patent application Ser. No. 15/630,022, filed Jun. 22, 2017, now U.S. Pat. No. 10,884,977, the disclosure of which is hereby incorporated by reference in its entirety.

BACKGROUND OF THE INVENTION

1. Field of the Invention

The present disclosure generally relates to systems and methods for distributed file processing, including, for example, distributed file archival and distributed file restoration.

2. Description of the Related Art

Distributed computing environments produce fast-growing data sets that are stored for long periods of time due to regulatory or other business requirements. To reduce the storage costs, infrequently used data are often archived to lower-cost, high capacity storage mediums. Modern archive storage solutions feature cloud-based architectures that span multiple data centers to provide additional data availability, resiliency and security. Such solutions offer a web service interface as a way to archive and access data objects.

While very generic, such archiving service interfaces do not present an efficient way of moving very large numbers of various application data files that are usually stored on higher-tiered storage mediums. Application data are often organized in a directory structure and can have a very large number of files that vary in size from a few bytes to hundreds of gigabytes. On the other hand, web services work optimally with objects of a certain size and handle a single object per call. This mismatch between the source data structure and the object-based archiving service interface is exacerbated by a very low data throughput rate (averaging about 2 MB/s) per web service call. This can cause the archival of very large, terabyte-sized data to take several days to complete.

SUMMARY OF THE INVENTION

Systems and methods for distributed file processing are disclosed. In one embodiment, a computer-implemented method for distributed file processing in a distributed network may include: (1) receiving, at a first distributed host in a network of a plurality of distributed hosts, an archive command; (2) the first distributed host identifying a plurality of files in a shared file system to archive in response to the archive command; (3) the first distributed host splitting at least one of the plurality of files that is above a predetermined size into a plurality of file chunks; (4) the first distributed host instructing a second distributed host to archive one of the plurality of files or plurality of file chunks to a store; and (5) the first distributed host and the second distributed host archiving the plurality of files and the plurality of file chunks to the store.

In one embodiment, the method may further include the first distributed host generating a listing of the files and file chunks that are archived.

In one embodiment, the listing may identify each file or file chunk and a location of each file or file chunk in the shared file system.

In one embodiment, each file and file chunk may be associated with metadata comprising a checksum.

In one embodiment, each file and file chunk may be associated with metadata comprising an indicator indicating whether each file or file chunk is encrypted and/or compressed.

In one embodiment, the method may further include the first distributed host and the second distributed host generating object access keys for each file.

In one embodiment, the method may further include the first distributed host or the second distributed host compressing one of the files or file chunks.

In one embodiment, the method may further include the first distributed host or the second distributed host encrypting one of the files or file chunks.

According to another embodiment, a computer-implemented method for distributed file processing in a distributed network may include: (1) receiving, at a first distributed host in a network of a plurality of distributed hosts, a restore command; (2) the first distributed host identifying a plurality of files in a store to restore to a shared file system in response to the restore command; (3) the first distributed host instructing a second distributed host to restore one of the plurality of files to the shared file system; and (4) the first distributed host and the second distributed host writing the plurality of files and the plurality of file chunks to the shared file system.

In one embodiment, one of the plurality of files in the store may comprise a plurality of file chunks.

In one embodiment, the method may further include the first distributed host and the second distributed host identifying an offset for each of the file chunks.

In one embodiment, the method may further include the first distributed host and the second distributed host decompressing one of the files or file chunks.

In one embodiment, the method may further include the first distributed host and the second distributed host decrypting one of the files or file chunks.

In one embodiment, the method may further include the first distributed host and the second distributed host setting a permission for the file or file chunk based on metadata associated with the file or file chunk.

According to another embodiment, a system for distributed file processing in a distributed network may include a shared file system storing a plurality of files; a store for arching files; and a plurality of distributed hosts in a distributed network. A first distributed host may receive an archive command, identify a plurality of files in a shared file system to archive in response to the archive command; split at least one of the plurality of files that is above a predetermined size into a plurality of file chunks; and instruct a second distributed host to archive one of the plurality of files or plurality of file chunks to a store. The first distributed host and the second distributed host may then archive the plurality of files and the plurality of file chunks to the store.

In one embodiment, the first distributed host may generate a listing of the files and file chunks that are archived.

In one embodiment, the first distributed host may identify each file or file chunk and a location of each file or file chunk in the shared file system.

In one embodiment each file and file chunk may be associated with metadata comprising a checksum.

In one embodiment, each file and file chunk may be associated with metadata comprising an indicator indicating whether each file or file chunk is encrypted and/or compressed.

In one embodiment, the first distributed host and the second distributed host may generate object access keys for each file.

In one embodiment, the first distributed host or the second distributed host may compress one of the files or file chunks.

In one embodiment, the first distributed host or the second distributed host may encrypt one of the files or file chunks.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for distributed file processing, including, for example, distributed file archival and distributed file restoration.

In embodiments, a distributed archiving/restore tool enables scalable, efficient archiving of large quantities of data stored in higher tier, high cost storage mediums requires a solution that is scalable and well-preforming. The distributed archiving/restore tool takes advantage of distributed computing and cloud-based object-level storage environments.

The distributed archiving/restore tool's interface is similar to the standard, widely popular UNIX archiving tools (e.g., ar, tar, jar). Once configured with a cloud-based archiving service provider, the distributed archiving/restore tool may not require any additional command-line attributes to connect to the storage provider's web service. Handling of very large directory structures and varieties of different file types and sizes is seamless.

In embodiments, the distributed archiving tool may split files above a certain size into smaller parts (or "chunks"). Each file above a certain size may be compressed prior to archival.

In one embodiment, the distributed restore tool may reassemble the files from the archive.

In one embodiment, the distributed archiving/restore tool may use a distributed computing environment to highly parallelize both data archival and restoration. This may raise the throughput rate to several hundreds of megabytes per second. In one embodiment, the distributed archiving tool assigns each configured host a "chunk" of the file to store as an object into, for example, a cloud-based storage provider. Other storage types and provider types may be used as is necessary and/or desired.

In one embodiment, the order in which the files are archived or restored may be based on file size, with the largest files being handled first. Any order of archival/restore may be used as is necessary and/or desired.

After all file chunks are processed, the distributed archiving tool may write a file assembly metadata object onto the storage (e.g., cloud storage). The metadata object may include a checksum for each archived file.

In embodiments, the distributed restore tool operation may work in the opposite direction by obtaining the metadata object from storage (e.g., cloud storage) first and then distributing the restore operation across all available hosts to retrieve all file chunk data objects associated with a file. The distributed restore tool may then assemble the file in the correct order and location on the application shared storage medium.

In one embodiment, the distributed restore tool may perform a checksum comparison on all restored files against the values stored in the metadata to verify the integrity of the restored files.

Figure 1:
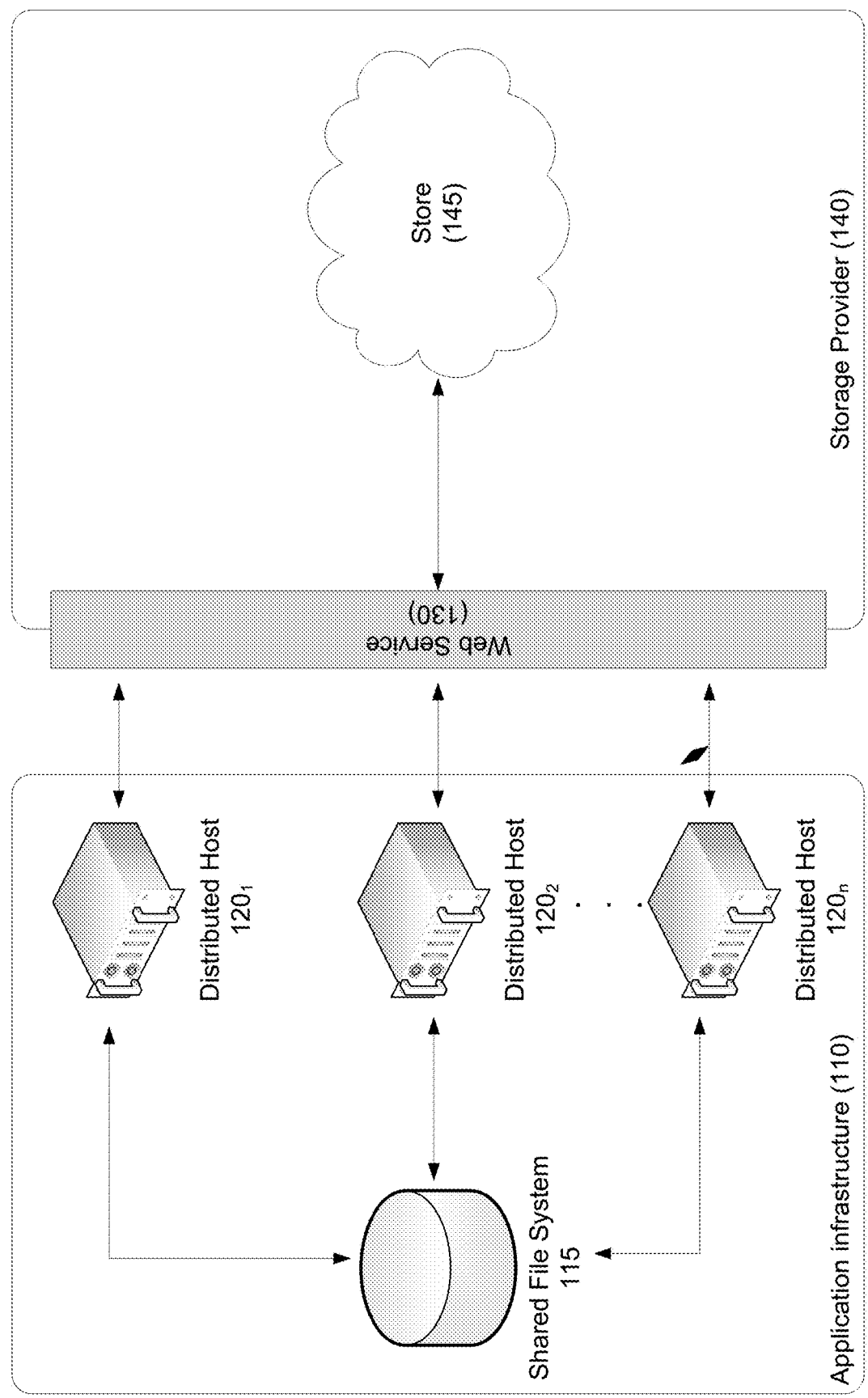
FIG. 1 depicts a system for distributed file archival according to one embodiment.

Referring to FIG. 1, a system for distributed file processing is disclosed according to one embodiment. System 100 may include application infrastructure 110, which may include shared file system 115 and a plurality of distributed hosts $120_1$, $120_2$, ... $120_n$. Shared file system 115 may be any suitable file system, including, for example NAS, SAN, HDFS, NTFS, etc.

Distributed hosts $120_1$, $120_2$, ... $120_n$ may include any suitable distributed computing system, server, etc. Examples of distributed hosts 120 include Microsoft Windows-based hosts, Linux-based hosts, etc. The number of distributed hosts $120_1$, $120_2$, ... $120_n$ may vary as is necessary and/or desired.

In one embodiment, each distributed hosts $120_1$, $120_2$, ... $120n$ may execute an instance of a distributed archiving/restore tool instance. In one embodiment, the distributed archiving may be a script that may be written in any suitable programming language (e.g., Python, Java, C/C++, etc.). In one embodiment, each distributed host $120_1$, $120_2$, ... $120_n$ may have an instance of the distributed archive tool installed. In another embodiment, the distributed archiving/restore tool may be available on, for example, a shared file system that each distributed host $120_1$, $120_2$, ... $120_n$ may access.

In one embodiment, during execution, one of the distributed hosts 120 may be a master, while the other distributed hosts 120 may be slaves. In one embodiment, the master distributed host 120 may be the distributed host on which the distributed archiving/restore command was initiated.

As illustrated in FIG. 1, each distributed host $120_1$, $120_2$, ... $120_n$ may access shared file system 115, as well as web service 130.

In one embodiment, web service 130 may be any suitable web service that may provide an interface to storage provider 140 and storage 145. Example web services include any REST-based web service, including, for example, S3.

In another embodiment, an API that may be made available by storage provider 140 may be used.

Storage provider 140 may be an internal or an external provider for data storage. In one embodiment, storage provider 140 may provide store 145, which may be a remote, cloud-based object store, a key-based object store, etc. Other types of stores 145 may be used as is necessary and/or desired.

Figure 2:
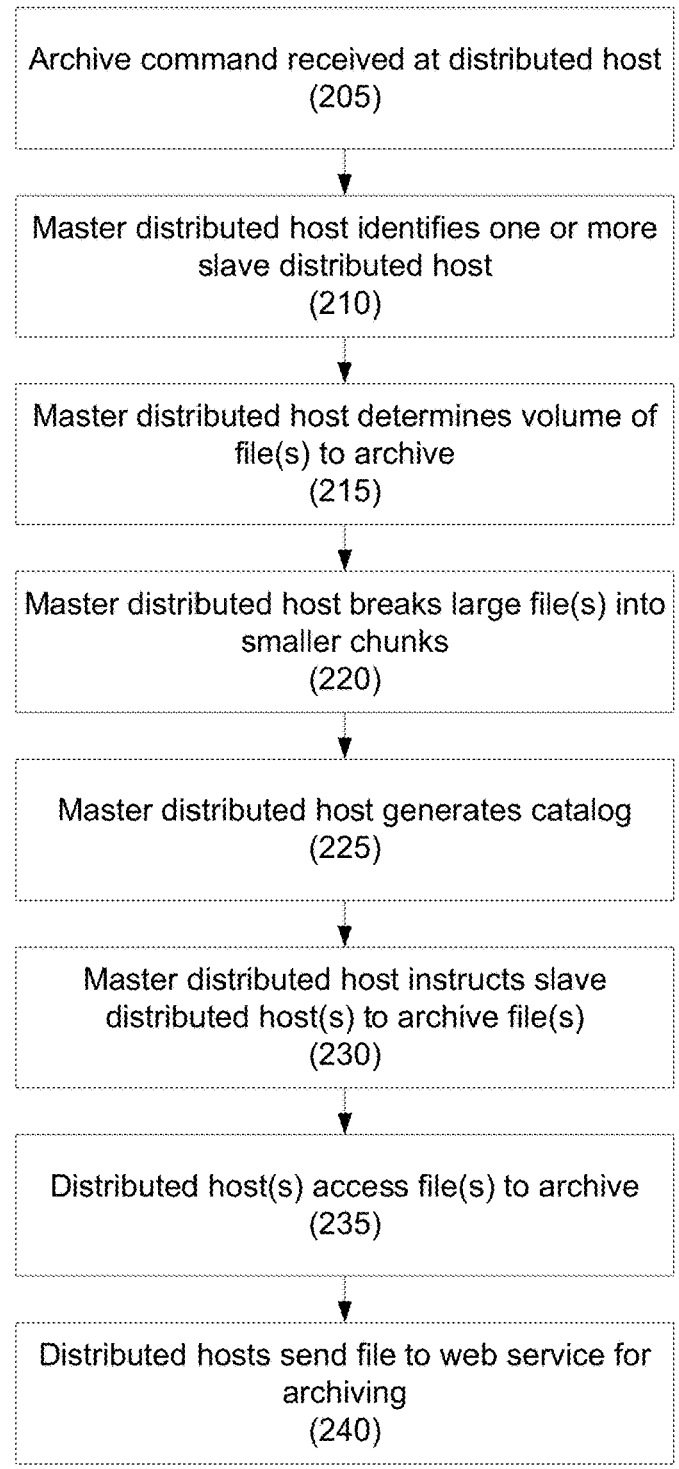
FIG. 2 depicts a method for distributed file archival according to one embodiment.

Referring to FIG. 2, a method for distributed file archival is disclosed according to one embodiment. In step 205, an archive command may be received at one of a plurality of distributed hosts. In one embodiment, the command may specify a file, files, a file system, a directory, etc. to archive.

In step 210, the distributed host receiving the archive command may act as a master distributed host and may coordinate the operation of one or more slave distributed hosts. In one embodiment, the master distributed host may identify one or more slave distributed host to perform the archive.

In step 215, the master distributed host may access the shared file system and may identify the files to be archived.

In step 220, the master distributed host may break each file that is above a certain size into two or more files, or chunks. In one embodiment, each chunk may be archived in an object having a key that contains a filename, a path of the directory that contains the file, and the start offset of the data within the file.

In step 225, the master distributed host may generate metadata that identifies the file(s), the file chunk(s), the location in the shared file system, etc. In one embodiment, the metadata may further include a checksum for each file, the file/chunk size, file permissions, a flag that indicates whether the chunk is compressed, a flag which indicates whether it is encrypted, etc. In one embodiment, the metadata may be stored in the cloud storage as part of the object.

In step 230, the master distributed host may instruct each slave distributed host to access a file or file chunk for archive. In one embodiment, the master distributed host may start with the largest file(s). Other orders of archiving the file(s) and/or file chunk(s) may be used as is necessary and/or desired.

In step 235, the master and slave distributed hosts may access the file(s) and file chunk(s), and, in step 240, the files and/or file chunks with generated object access keys are sent to a web service for storage with a storage provider, such as a cloud-based object store. Object keys may be generated by combining the file's original path in the shared file system, the filename, and the start offset if the object is a file chunk.

In one embodiment, metadata may be used to indicate file permissions, chunk start offset, compression status, etc.

In one embodiment, the master and slave distributed host may compress and/or encrypt some or all of the files and file chunks.

In step 240, when all file(s) and file chunk(s) have been written to the store, the master distributed host may write the metadata to the store with the storage provider.

It should be noted that the order of steps in FIG. 2 is exemplary only, and some steps may occur in a different order as is necessary and/or desired.

Figure 3:
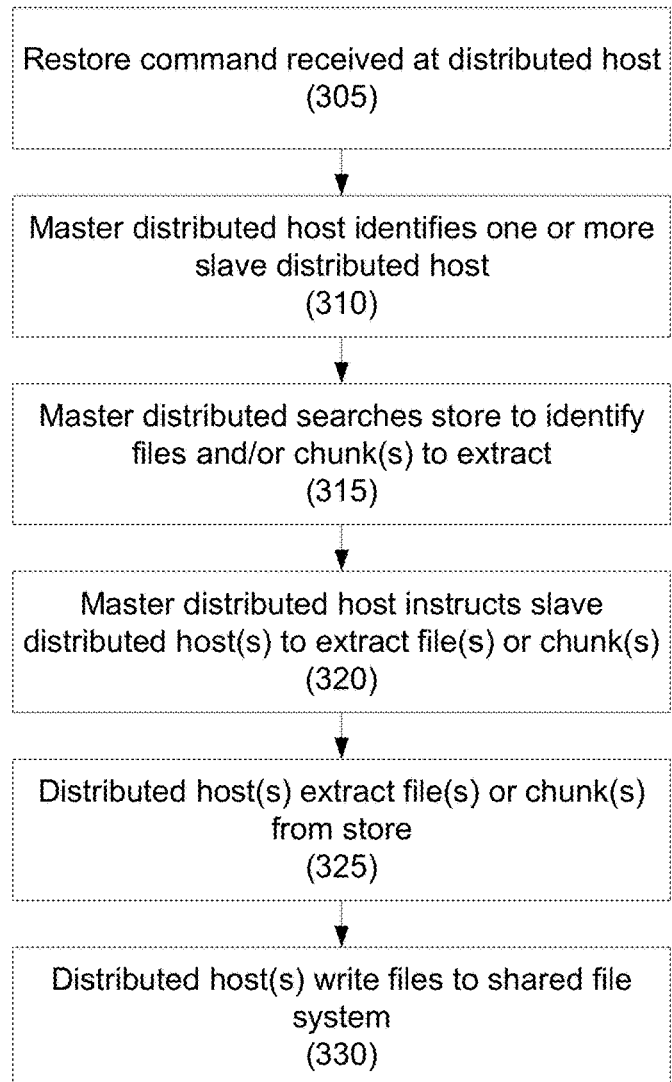
FIG. 3 depicts a method for distributed file restoration according to one embodiment.

Referring to FIG. 3, a method for distributed file restore is disclosed according to one embodiment.

In step 305, a restore command may be received at a distributed host. In one embodiment, the command may specify a file, files, a file system, a directory, etc. to restore. The manner in which the restore command may be similar to the manner in which the archive command is received.

In step 310, the distributed host receiving the restore command may act as a master distributed host and may coordinate the operation of one or more slave distributed hosts. In one embodiment, the master distributed host may identify one or more slave distributed host to perform the data restore.

In step 315, the master distributed host may access the store to identify file(s) and/or file chunk(s) to extract.

In step 320, the master distributed host may instruct each slave distributed host to extract a file or file chunk. In one embodiment, the master distributed host may start with the largest file(s). Other orders of extracting the file(s) and/or file chunk(s) may be used as is necessary and/or desired.

In step 325, the master and slave distributed hosts may access the file(s) and/or file chunk(s) and extract them from the store.

In one embodiment, the master and slave distributed hosts may decompress and/or decrypt the file or file chunk as necessary.

In step 330, the master and slave distributed hosts may write the files to the shared file system.

In one embodiment, the distributed hosts may open the file on the shared file system that corresponds to the chunk and seek to the chunk's start offset. It may then write the chunk's data to the shared file system, and may set the file's permissions to match the permissions indicated in the file chunk metadata.

It should be noted that the order of steps in FIG. 3 is exemplary only, and some steps may occur in a different order as is necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a cardholder or cardholders of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "cardholder interfaces" may be utilized to allow a cardholder to interface with the processing machine or machines that are used to implement the invention. As used herein, a cardholder interface includes any hardware, software, or combination of hardware and software used by the processing machine that allows a cardholder to interact with the processing machine. A cardholder interface may be in the form of a dialogue screen for example. A cardholder interface may also include any of a mouse, touch screen, keyboard, keypad, voice reader, voice recognizer, dialogue screen, menu box, list, checkbox, toggle switch, a pushbutton or any other device that allows a cardholder to receive information regarding the operation of the processing machine as it processes a set of instructions and/or provides the processing machine with information. Accordingly, the cardholder interface is any device that provides communication between a cardholder and a processing machine. The information provided by the cardholder to the processing machine through the cardholder interface may be in the form of a command, a selection of data, or some other input, for example.

As discussed above, a cardholder interface is utilized by the processing machine that performs a set of instructions such that the processing machine processes data for a cardholder. The cardholder interface is typically used by the processing machine for interacting with a cardholder either to convey information or receive information from the cardholder. However, it should be appreciated that in accordance with some embodiments of the system and method of the invention, it is not necessary that a human cardholder actually interact with a cardholder interface used by the processing machine of the invention. Rather, it is also contemplated that the cardholder interface of the invention might interact, i.e., convey and receive information, with another processing machine, rather than a human cardholder. Accordingly, the other processing machine might be characterized as a cardholder. Further, it is contemplated that a cardholder interface utilized in the system and method of the invention may interact partially with another processing machine or processing machines, while also interacting partially with a human cardholder.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for distributed file processing in a distributed network, comprising:
   a shared file system;
   a store comprising a plurality of files;
   a plurality of distributed hosts in a distributed network, each distributed host comprising at least one computer processor, wherein:
   a first distributed host receives a restore command;
   the first distributed host identifies a plurality of files in the store of a service provider, via a web service interface, to restore to the shared file system in response to the restore command;
   the first distributed host instructs a second distributed host to restore one of the plurality of files to the shared file system; and
   the first distributed host and the second distributed host each write the plurality of files and a plurality of file chunks to the shared file system in response to receiving the restore command;
   wherein the first distributed host and the second distributed host have a master-slave relationship, with the first distributed host being the master, and the second distributed host being the slave.

2. The system of claim 1, wherein one of the plurality of files in the store comprises a plurality of file chunks.

3. The system of claim 2, wherein the first distributed host and the second distributed host identify an offset for each of the file chunks.

4. The system of claim 1, wherein the first distributed host and the second distributed host decompress one of the files or file chunks.

5. The system of claim 1, wherein the first distributed host and the second distributed host decrypt one of the files or file chunks.

6. The system of claim 1, wherein the first distributed host and the second distributed host set a permission for the file or file chunk based on metadata associated with the file or file chunk.

* * * * *